J. GIANNINOTO.
DEVICE FOR HANDLING CUSPIDORS.
APPLICATION FILED APR. 24, 1917.

1,249,946.

Patented Dec. 11, 1917.

WITNESSES

INVENTOR
John Gianninoto
BY
ATTORNEYS

UNITED STATES PATENT OFFICE.

JOHN GIANNINOTO, OF BROOKLYN, NEW YORK.

DEVICE FOR HANDLING CUSPIDORS.

1,249,946.      Specification of Letters Patent.      Patented Dec. 11, 1917.

Application filed April 24, 1917. Serial No. 164,139.

*To all whom it may concern:*

Be it known that I, JOHN GIANNINOTO, a subject of the King of Italy, and a resident of the city of New York, borough of Brooklyn, in the county of Kings and State of New York, have invented a new and Improved Device for Handling Cuspidors, of which the following is a full, clear, and exact description.

My invention relates to a means adapted to be applied to a cuspidor, whereby to enable the same to be lifted and carried to a place of dumping and the carrying means then manipulated to dump the cuspidor, the purpose being to minimize the unpleasantness of the work.

In carrying out my invention in practice I provide on the cuspidor loops or equivalent elements permanently secured at separate points therearound or otherwise, there being a pair of loops diametrically opposite, and a third loop equidistant from the others. A carrying device in the form of a bail is provided having hooks pivoted thereto adapted to detachably engage the loops provided on the cuspidor at diametrically opposite sides. Pivotally attached to the bail is a transverse frame suspended from which is a third hook to engage the third loop on the cuspidor and movably connected with said transverse frame to assume different angular positions relatively thereto, the said frame and bail being movable on their pivots to tilt and dump the cuspidor.

The nature of the invention and the advantages of the structural embodiment characterizing the preferred form will clearly appear as the description proceeds.

Reference is to be had to the accompanying drawings forming a part of this specification in which similar reference characters indicate corresponding parts in all the views.

Figures 1, 2:
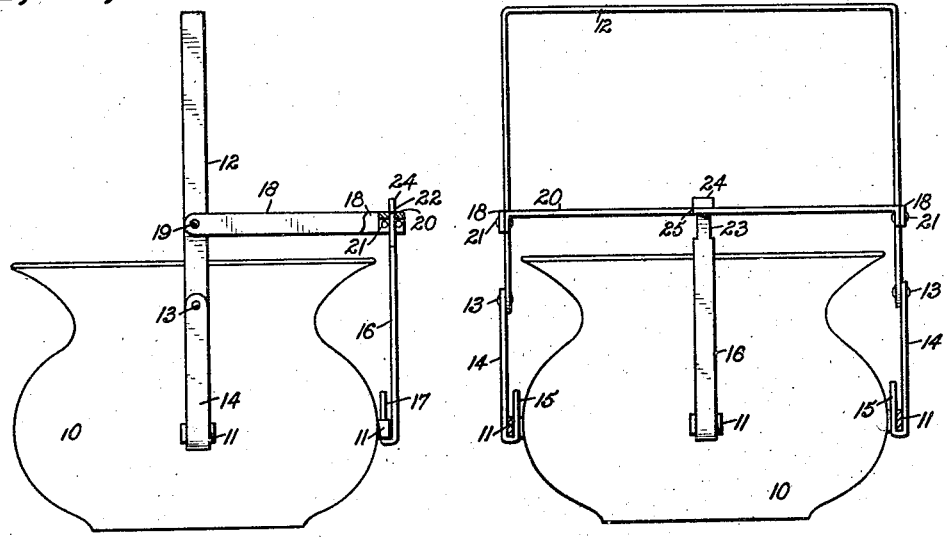
Figure 1 is a side elevation of a cuspidor and a handling means embodying my invention, parts being broken away and others in section.
Fig. 2 is a rear elevation.

The numeral 10 indicates a cuspidor which may be of any desired shape and formed of any suitable material. Secured to the cuspidor, in a suitable manner, are a series of loops or equivalent sockets or the like designated by the numeral 11, there being two of these loops disposed diametrically opposite, and a third equidistant from the others.

My carrying and dumping means includes a bail 12 to the lower end of each side of which is pivotally connected a hook 14, the bill 15 of which is turned inwardly to effect hooked engagement with opposite loops 11. The hooks when thus engaged with loops 11 constitute suspending arms for the cuspidor.

A third suspending arm 16 has an inwardly turned bill 17 to engage the third loop 11. The upper end of the shank of the said hook 16 is hung upon a transverse frame 18 pivoted at the ends of the side arms as at 19 to the bail 12 above the pivots 13. The numeral 20 indicates the cross bar of the frame 18 which may be suitably fastened to the side arms of the frame by rivets 21 or united with the side arms in any other suitable manner. A loose connection is established between the cross bar 20 and the carrying hook 16 for which purpose, in the illustrated construction, a slot 22 is produced in the said cross bar, in which slot the reduced portion 23 of the shank of the hook is loosely accommodated, the upper end 24 of the hook thus constituting a head larger than the slot so that the shank of the hook cannot drop through the said slot but the hook will nevertheless have a freedom of movement to vary its angular relation to the frame 18. To enter the reduced portion of the shank 23 in the slot 22, the bar 20 may be slitted as at 25 from an edge of the cross bar to the slot 22, it being understood that the slitted portion is bent out of the plane of the bar 20 sufficient for the entrance of the shank after which the slitted portion is restored to close the slot and retain the hook suspended.

Figures 3, 4:
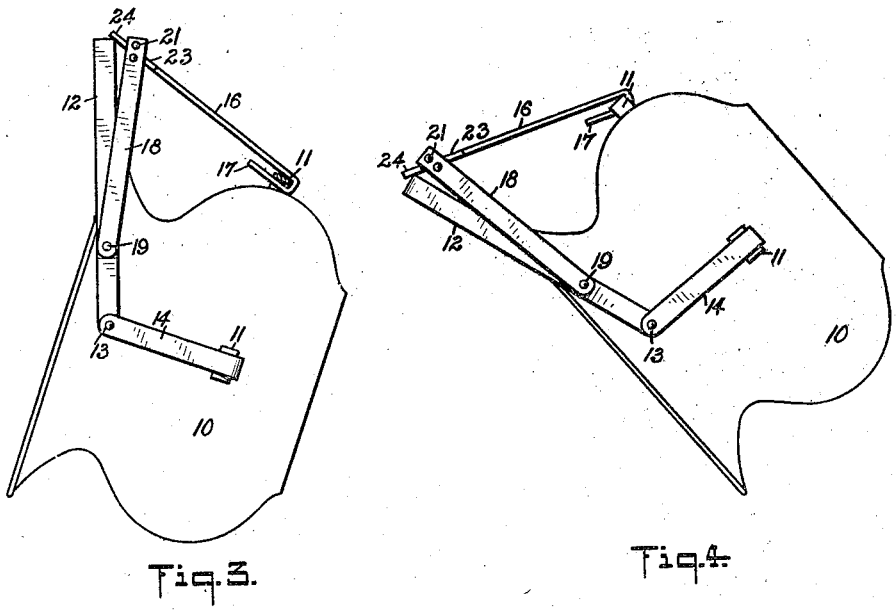
Fig. 3 is a side elevation partly in section, showing the cuspidor partly tilted.
Fig. 4 is a side elevation with the handling devices and cuspidor in position for dumping the latter.

From the above description taken in connection with the drawing, it will be understood that the bail 12 with the hooks 14 in vertical position may be quickly manipulated to engage the bills 15 of the said hooks with the diametrically opposite loops 11 after which the bill 17 of the hook 16 is engaged with the third loop 11, the pivots 19 and the loose connection of the hooks 16 serving to facilitate the engagement of the bill 17. The cuspidor may now be lifted by the bail 12 and be maintained level to be conveniently carried to the place of dumping, after which the bail is swung rearwardly and the frame 18 raised toward the bail whereby to lift the rear end of the cuspidor engaged by the bill 17 to bring the bail and handle together for complete control by the user after which the cuspidor may be readily brought to the dumping position as illustrated in Fig. 4.

I wish to state in conclusion that although the illustrated example constitutes a practical embodiment of my invention, I do not limit myself to the mechanical details herein illustrated, since manifestly the same can be considerably varied without departure from the spirit of the invention as defined in the appended claims.

Having thus described my invention I claim as new, and desire to secure by Letters Patent:

1. In means for handling cuspidors, means to effect detachable engagement with the cuspidor at diametrically opposite points, a carrying bail pivotally connected with the second means, means to support the cuspidor at a third point approximately equidistant from the others, and a transverse frame pivotally connected at its front end with the said bail, above the pivotal connection thereof with the first supporting means, said frame being loosely connected with the second supporting means to assume different angular positions relatively to said second supporting means and relatively to the bail for dumping the cuspidor.

2. In a device of the class described, a pair of carrying arms having means thereon to afford support for a cuspidor at diametrically opposite sides, a bail pivotally connected with the said side arms, a third carrying arm to support the cuspidor at an intermediate point, and a frame having side arms pivotally connected with the bail above the first pivots and having a cross bar from which the third carrying arm is suspended and with which the third arm is loosely connected.

3. The combination with a cuspidor having loops at diametrically opposite sides and a third loop at a third side approximately equidistant from the first loops, of hooks pivotally carried by the bail at the bottom thereof adapted to engage the first mentioned loops, a transverse frame pivotally connected with the bail, and a hook suspended from the said frame and adapted to detachably connect with the third loop on the cuspidor.

JOHN GIANNINOTO.

Copies of this patent may be obtained for five cents each, by addressing the "Commissioner of Patents, Washington, D. C."